(12) United States Patent
Fan et al.

(10) Patent No.: US 9,464,236 B2
(45) Date of Patent: Oct. 11, 2016

(54) COMPOSITIONS AND METHODS FOR RECOVERING AND/OR REMOVING REAGENTS FROM POROUS MEDIA

(71) Applicant: GREEN SOURCE HOLDINGS LLC, Austin, TX (US)

(72) Inventors: Liang-tseng Fan, Manhattan, KS (US); Shahram Reza Shafie, Austin, TX (US); Julius Michael Tollas, The Woodlands, TX (US); William Arthur Fitzhugh Lee, Spicewood, TX (US)

(73) Assignee: Green Source Holdings LLC, Austin, TX (US)

( * ) Notice: Subject to any disclaimer, the term of this patent is extended or adjusted under 35 U.S.C. 154(b) by 0 days.

(21) Appl. No.: 14/869,109

(22) Filed: Sep. 29, 2015

(65) Prior Publication Data

US 2016/0017237 A1 Jan. 21, 2016

Related U.S. Application Data

(63) Continuation of application No. 14/375,730, filed as application No. PCT/US2013/024491 on Feb. 1, 2013, now Pat. No. 9,181,490.

(60) Provisional application No. 61/594,129, filed on Feb. 2, 2012.

(51) Int. Cl.
| | |
|---|---|
| *B01D 11/04* | (2006.01) |
| *B01D 11/02* | (2006.01) |
| *C10G 1/04* | (2006.01) |
| *C10G 1/10* | (2006.01) |
| *C08J 11/02* | (2006.01) |
| *C10L 5/04* | (2006.01) |

(52) U.S. Cl.
CPC ........... *C10G 1/045* (2013.01); *B01D 11/0288* (2013.01); *B01D 11/0292* (2013.01); *C08J 11/02* (2013.01); *C10G 1/04* (2013.01); *C10G 1/10* (2013.01); *C10L 5/04* (2013.01); *C08J 2317/00* (2013.01); *C10G 2300/1003* (2013.01); *C10L 2290/544* (2013.01)

(58) Field of Classification Search
CPC ... B01D 11/02; B01D 11/0288; B01D 11/04; B01D 11/0415; B01D 11/0492; C08F 6/10; B29C 2071/0036; B29C 2071/0045
See application file for complete search history.

(56) References Cited

U.S. PATENT DOCUMENTS

| | | | |
|---|---|---|---|
| 3,532,677 | A | 10/1970 | Baron et al. |
| 4,539,097 | A | 9/1985 | Kelterborn et al. |
| 2006/0076274 | A1 | 4/2006 | Duyvesteyn et al. |
| 2007/0259046 | A1 | 11/2007 | Vanhoorne et al. |
| 2008/0156702 | A1 | 7/2008 | Duyvesteyn |
| 2008/0210602 | A1 | 9/2008 | Duyvesteyn |
| 2010/0173806 | A1 | 7/2010 | Fan et al. |
| 2011/0180459 | A1 | 7/2011 | Duyvesteyn et al. |
| 2012/0149626 | A1* | 6/2012 | Fluck ....................... C11D 1/72 510/365 |

FOREIGN PATENT DOCUMENTS

| | | |
|---|---|---|
| CA | 1235379 A1 | 4/1988 |
| CA | 2006483 | 1/1999 |
| CN | 1424126 A | 6/2003 |
| CN | 1445392 A | 9/2003 |
| CN | 101868517 A | 10/2010 |
| JP | 2000-7323 A | 1/2000 |

OTHER PUBLICATIONS

Vert, M. et al.: "Terminology for biorelated polymers and applications (IUPAC Recommendations 2012)", Pure Appl. Chem., vol. 84, No. 2, pp. 377-410, Jan. 11, 2012.
Written Opinion and Search Report issued in Singapore Patent Application No. 11201404544S on Jun. 24, 2015, 21 pages.
Office Action issued in Chinese Patent Application No. 2013800173131 on Aug. 26, 2015, 18 pages.
Speight, J. et al.: "Natural Bitumen (Tar Sands) and Heavy Oil", Coal, Oil Shale, Natural Bitumen, Heavy Oil and Peat, vol. II, Natural Bitument (Tar Sands) and Heavy Oil, Encyclopedia of Life Support Systems, 8 pages.

* cited by examiner

*Primary Examiner* — Brian McCaig
(74) *Attorney, Agent, or Firm* — Rothwell, Figg, Ernst & Manbeck, P.C.

(57) ABSTRACT

A composition and method for displacing, dissolving, extracting, recovering, and/or removing solvent and/or any solvent-associated liquids from a solvent-treated material or penetrating through pores or the surface of a solvent-treated material using a solvent-extracting composition for contacting solvent-treated material and separating the solvent and any solvent-associated liquids from the solvent-treated material as well as the solvent-extracting composition.

37 Claims, No Drawings

COMPOSITIONS AND METHODS FOR RECOVERING AND/OR REMOVING REAGENTS FROM POROUS MEDIA

CROSS REFERENCE TO RELATED APPLICATIONS

"The present application is a Continuation of U.S. application Ser. No. 14/375,730, now U.S. Pat. No., 9,181,490, filed Jul. 30, 2014, which is a 35 U.S.C. §371 National Phase Entry Application from PCT/US2013/024491, filed Feb. 1, 2013, and designating the United States, which claims the benefit of U.S. Provisional Application No. 61/594,129 filed Feb. 2, 2012, the entire disclosures of which are incorporated herein by reference in their entireties."

FIELD OF THE INVENTION

The present invention relates to the field of removal, displacement, dissolution, extraction, or penetration through pores or surface of a material containing solvent trapped in its pores after a process of extracting hydrocarbons from the material or solvent treatment of the materials.

BACKGROUND OF THE INVENTION

Processes for the devulcanization of rubber, as well as the liquefaction, solubilization and/or extraction of hydrocarbon-containing organic matter from hydrocarbon-containing materials, using turpentine liquids have been developed as described in U.S. Pat. Nos. 7,767,722 and 8,101,812. Processes for the recycling of plastics comprising polymers via solvent treatment have been developed as described in PCT Pub. No. WO 2012/033742. However, because a substantial portion of the solvents, e.g., turpentine liquids, remain trapped within these materials after treatment, there remains a need in the art for a method of dissolving, extracting, and/or removing solvents such as turpentine liquids from the turpentine liquid-treated rubbers, plastics, and hydrocarbon-containing materials.

Devulcanized rubber, rubber, partially devulcanized rubber, plastics containing polymers, recycled plastics, recovered plastics, silicon substrates, limestone, natural and synthetic porous materials, mineral and rock formations, sponges, and hydrocarbon-containing materials that have been treated with solvents may contain various amounts of those solvents trapped within the pores of the materials, plastics, or rubber. In order to further use or process these materials, it is necessary to remove the trapped solvents and liquids that are associated with the trapped solvents. Further, in order to effect economical processes, it is advantageous to remove and recycle as much of the trapped solvents as possible for reuse.

The liquefaction, solubilization and/or extraction of fossil fuels, also called hydrocarbon-containing organic matter, in solid, semi-solid, highly viscous or viscous form (individually and jointly referred to as fossil fuels hereafter) have proven to be extremely challenging and difficult. As used herein, such fossils fuels include, but are not limited to, hydrocarbon-containing organic matter within coal, oil shale, tar (oil) sands and oil sands (hereinafter referred to as "tar (oil) sands," "tar sands," or "oil sands," interchangeably), as well as crude oil, heavy or extra heavy crude oil, natural gas and petroleum gas, crude bitumen, kerogen, natural asphalt and/or asphaltenes hydrocarbon. The difficulty can in part be attributed to the fact that these fossil fuels include complex organic polymers linked by oxygen and sulfur bonds, which are often imbedded in the matrices of inorganic compounds. A need exists to produce additional liquid hydrocarbon feed stock for the manufacture of liquid and gaseous fuels as well as for the production of various chemicals, pharmaceuticals and engineered materials as the demand and consumption for hydrocarbon based materials increases.

SUMMARY OF INVENTION

In accordance with one embodiment of the present invention, the present invention provides a method for displacing, removing and recovering trapped reagents such as solvents and/or associated liquids that are contained in rubber, plastics, hydrocarbon-containing material, or any other type of material or other porous material that has such reagents trapped within its pores. The materials may include, but are not limited to rubber, devulcanized rubber, partially devulcanized rubber, plastics containing polymers, recycled plastics, recovered plastics, silicon substrates, limestone, natural and synthetic porous materials, mineral and rock formations, sponges, waste, and hydrocarbon-containing materials. Hydrocarbon-containing organic matter includes, but is not limited to, heavy crude oil, crude oil, oil shale, tar (oil) sands, coal, bitumen, and the like. Exemplary hydrocarbon-containing materials can also include oil tank bottoms, oil pit or pond sludge and slurry mix, discarded foods, manure, sewage sludge or municipal garbage. For example, the material has previously been treated with a solvent (hereinafter the material will be referred to as the "solvent-treated material") and optionally also treated with associated liquids such as lower aliphatic alcohols, alkanes, aromatics, aliphatic amines, aromatic amines, carbon bisulfide and mixtures thereof. "Solvent-associated liquids" may also include hydrocarbons, sulfur-containing materials, polymers, and other compounds from within the material that have been dissolved into the solvent, and which remain trapped within the solvent-treated material.

The method includes the steps of providing an alcohol, an organic compound with a hydroxyl functional group, and/or one or more common solvents such as an organic or inorganic solvent, and contacting the solvent-treated material with the alcohol, or a mixture of the alcohol with an organic compound with one or more hydroxyl functional group(s) and/or an organic or inorganic solvent, such that a recovery mixture is formed, as well as residual material. The recovery mixture contains at least a portion of the solvent that was trapped within the solvent-treated material (hereinafter referred to as the "trapped solvent") and at least one of the alcohol, the organic compound with one or more hydroxyl functional group(s), and/or organic or inorganic solvent. The residual material includes non-soluble material from the solvent-treated material. The residual material can also include a reduced portion of the trapped solvent in the circumstance where all such trapped solvent has not been solubilized by the alcohol, the organic compound with a hydroxyl functional group, and/or organic or inorganic solvent, and moved into the recovery mixture. The residual material is then separated from the recovery mixture. The recovery mixture is further separated into a first portion and a second portion. The first portion of the recovery mixture includes a trapped solvent product stream that includes at least a portion of the trapped solvent extracted from the solvent-treated material. The second portion of the recovery mixture includes at least a portion of the alcohol, the organic compound with a hydroxyl functional group, and/or organic or inorganic solvent. In one embodiment, substantially all of the trapped solvent is recovered in the recovery mixture.

In another embodiment, the present invention provides a composition for extracting, removing and recovering trapped solvent and other associated liquids that are contained in rubber or hydrocarbon-containing material that has been treated with a solvent, e.g., a turpentine liquid. The composition, which hereinafter will be referred to as the "solvent-extracting composition" can include one or more of an alcohol, the organic compound with a hydroxyl functional group, and/or organic or inorganic solvent.

A method of extracting hydrocarbon-containing organic matter from a hydrocarbon-containing material is provided, which includes the steps of providing a first liquid including a turpentine liquid and contacting the hydrocarbon-containing material with the turpentine liquid such that an extraction mixture is formed, as well as residual material. The extraction mixture contains at least a portion of the hydrocarbon-containing organic matter and the turpentine liquid. The residual material includes non-soluble material from the hydrocarbon-containing material. The residual material can also include a reduced portion of the hydrocarbon-containing organic matter in the circumstance where all such hydrocarbon-containing material has not been solubilized by the turpentine liquid and moved into the extraction mixture. The residual material is then separated from the extraction mixture. The extraction mixture is further separated into a first portion and a second portion. The first portion of the extraction mixture includes a hydrocarbon product stream that includes at least a portion of the hydrocarbon-containing organic matter extracted from the hydrocarbon-containing material. The second portion of the extraction mixture includes at least a portion of the turpentine liquid. In one embodiment, at least a portion of the turpentine liquid is recycled to the hydrocarbon-extracting liquid.

DETAILED DESCRIPTION OF THE INVENTION

In one aspect, the present invention relates to a readily deployed composition for the dissolution, extraction, or penetration through pores or surface of a material containing solvent and associated liquids trapped in pores of a solvent-treated material (the "solvent-extractingremoving composition"). The present invention also relates to a readily deployed composition for use in a process for extraction, liquefaction and/or solubilization of fossil fuels from coal, oil shale, crude oil, and tar (oil) sands.

According to one embodiment, a method is provided including the steps of displacing, dissolving, extracting, recovering, removing, and/or penetrating through the pores or surface of a material containing solvent trapped in its pores after a process of extracting hydrocarbons from the material. The material containing trapped solvent may have been previously treated with turpentine liquid. Examples of such materials are plastics, coal, oil shale, tar (oil) sands, a reservoir containing crude oil, crude oil, natural gas (which frequently coexists with crude oils and other said fossil fuels), rubber that has been devulcanized using turpentine liquid, or a combination thereof. The material containing turpentine liquids can be solid, semi-solid, liquid, sludge, viscous liquid, or liquid. Other such materials can also include solvent-treated oil tank bottoms, oil pit or pond sludge and slurry mix, discarded foods, manure, sewage sludge or municipal garbage.

Displacing, extracting, recovering, removing, and/or penetrating through the pores or surface of a material containing solvent and associated liquids trapped in the pores of the material, which has been treated within the material includes the step of providing a solvent-extracting composition comprising, consisting essentially of, or consisting of an alcohol, an organic compound with a hydroxyl functional group, and/or an organic or inorganic solvent and contacting the turpentine liquid-treated material with the solvent-extracting composition such that a recovery mixture is formed, as well as residual material. In some embodiments, the solvent-extracting composition is a turpentine-extracting composition.

According to the present invention, the quantity of solvent trapped within the solvent-treated material is substantially reduced. For example, after devulcanization using a devulcanization fluid, the devulcanized rubber may contain up to about 50% of the devulcanization fluid trapped within its pores. According to the method described herein, a significant percentage of the devulcanization fluid can be extracted from the pores of the devulcanized rubber, e.g., at least 60%, 70%, 80%, 90% and up to 100% of the devulcanization fluid can be removed from the pores.

In one embodiment, the solvent is displaced, extracted, recovered, or removed using an alcohol, an organic compound with a hydroxyl functional group, and/or organic or inorganic solvent. Examples of solvents that can be displaced, extracted, recovered, or removed are turpentine liquids such as natural turpentine, synthetic turpentine, mineral turpentine, pine oil, alpha-pinene, beta-pinene, alpha-terpineol, beta-terpineol, gamma-terpineol, 3-carene, anethole, dipentene (p-mentha-1,8-diene), terpene resins, alpha-terpene, beta-terpene, gamma terpene, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, or mixtures thereof, alkanes, aromatics, aliphatic amines, aromatic amines, carbon bisulfide, solvents manufactured in petroleum refining, such as decant oil, light cycle oil and naphtha, solvents manufactured in dry distilling coal and fractionating liquefied coal, benzene, naphthalene, toluene, pentane, heptane, hexane, benzene, toluene, xylene, naphthalene, anthracene, tetraline, triethylamine, aniline, carbon bisulfide, and mixtures thereof.

In one embodiment, the solvent-extracting composition contains one or more acyclic or cyclic alcohols. For example, the alcohol can be simple alcohols such as methanol (methyl alcohol), ethanol (ethyl alcohol), propanol (propyl alcohol), isopropanol, butanol, isobutanol, pentanol and its eight more isomers (1-Pentanol, 3-Methyl-1-butanol, 2-Methyl-1-butanol, 2,2-Dimethyl-1-propanol, 3-Pentanol, 2-Pentanol, 3-Methyl-2-butanol, 2-Methyl-2-butanol) and hexanol and its sixteen more isomers (1-Hexanol, 2-Hexanol, 3-Hexanol, 2-Methyl-1-pentanol, 3-Methyl-1-pentanol, 4-Methyl-1-pentanol, 2-Methyl-2-pentanol, 3-Methyl-2-pentanol, 4-Methyl-2-pentanol, 2-Methyl-3-pentanol, Tertiary 3-Methyl-3-pentanol, Primary 2,2-Dimethyl-1-butanol, 2,3-Dimethyl-1-butanol, 3,3-Dimethyl-1-butanol, 2,3-Dimethyl-2-butanol, 3,3-Dimethyl-2-butanol, 2-Ethyl-1-butanol), lower aliphatic alcohols, or a mixture thereof. In certain embodiments, the alcohol is methanol (methyl alcohol), ethanol (ethyl alcohol), propanol (propyl alcohol), isopropanol, butanol, isobutanol, pentanol, hexanol, or a mixture thereof.

As used herein, the term "lower aliphatic alcohols" refers to primary, secondary and tertiary monohydric and polyhydric alcohols of between 2 and 12 carbon atoms. As used herein, the term "alkanes" refers to straight chain and branched chain alkanes of between 5 and 22 carbon atoms. As used herein, the term "aromatics" refers to monocyclic, heterocyclic and polycyclic compounds. As used herein, the term "aliphatic amines" refers to primary, secondary and tertiary amines having alkyl substituents of between 1 and 15 carbon atoms.

In another embodiment, the solvent-extracting composition contains an organic compound with a hydroxyl functional group.

In one embodiment, the solvent-extracting composition contains an organic or inorganic solvent, for example, benzene, toluene, methyl ethyl ketone (MEK), furfural, tertrahydrofuran (THF), acetone, hydrofluoric acid, hexane and xylene, or a mixture thereof.

In another embodiment, the solvent-extracting composition contains an alcohol, an organic compound with a hydroxyl functional group, and an organic or inorganic solvent, or a combination of any two thereof. The solvent-extracting composition may comprise, consist essentially of, or consist of an alcohol, an organic compound with a hydroxyl functional group, and/or an organic or inorganic solvent.

In yet another embodiment, the solvent-extracting composition contains a second liquid selected from alkanes, aromatics, aliphatic amines, aromatic amines, carbon bisulfide, vegetable oils, solvents manufactured in petroleum refining, dry distilling coal, fractionating liquefied coal, and fractionating extracted hydrocarbons from tar (oil) sands and oil shale, or a mixture thereof.

In certain embodiments, the ratio of alcohol to the organic compound with a hydroxyl functional group or the organic or inorganic solvent in the solvent-extracting composition to the second liquid is greater than or equal to about 1:1 by volume. In one embodiment, the ratio of alcohol to the organic compound with a hydroxyl functional group or the organic or inorganic solvent in the solvent-extracting composition to the second liquid is greater than or equal to about 3:1 by volume.

In another embodiment, the ratio of alcohol to the organic compound with a hydroxyl functional group or the organic or inorganic solvent in the solvent-extracting composition to the second liquid is between about 1:5 to 5:1 by volume. In one embodiment, the ratio of alcohol to the organic compound with a hydroxyl functional group or the organic or inorganic solvent in the solvent-removing composition to the second liquid is between about 1:2 to 2:1 by volume.

In one embodiment, the turpentine-extracting composition contains at least about 10% of the acyclic or cyclic alcohol. In another embodiment, the solvent-extracting composition contains at least about 30% of the acyclic or cyclic alcohol. In another embodiment, the solvent-extracting composition contains at least about 50% of the acyclic or cyclic alcohol. In another embodiment, the solvent-extracting composition contains at least about 70% of the acyclic or cyclic alcohol. In another embodiment, the solvent-extracting composition contains at least about 90% of the acyclic or cyclic alcohol. In another embodiment, the solvent-extracting composition contains about 100% of the acyclic or cyclic alcohol.

In one embodiment, the quantity of the solvent trapped within the pores of the solvent-treated material or at the surface of the solvent-treated material is reduced by at least about 10% and up to about 100%. In one embodiment, the quantity of the solvent contained within the solvent-treated material or at the surface of the solvent-treated material is reduced by at least about 50%. In one embodiment, the quantity of the solvent contained within the solvent-treated material or at the surface of the solvent-treated material is reduced by at least about 75%. In one embodiment, the quantity of the solvent contained within the solvent-treated material or at the surface of the solvent-treated material is reduced by about 100%.

As used herein, the term "substantially reduces" shall mean the amount of turpentine liquid contained in the solvent-treated material is reduced by at least about 50%.

The solvent-extracting composition is said to consist essentially of the alcohol, the organic compound with a hydroxyl functional group, and/or the organic or inorganic solvent if the alcohol, the organic compound with a hydroxyl functional group, and/or the organic or inorganic solvent is the essential active ingredient for substantially all of the solvent extraction and the other ingredients in the composition are essentially inactive or non-active in solvent extraction. Thus, in certain embodiments, the basic and novel characteristics of the present invention include a composition consisting essentially of an alcohol, the organic compound with a hydroxyl functional group, and/or the organic or inorganic solvent that excludes other active solvent-extracting ingredients.

As used herein, the term "non-active" shall mean that the ingredient is not present in an effective active amount for solvent extraction.

In another embodiment, the invention includes a method for penetrating through pores or the surface of a material that has previously been treated with one or more solvents. The method includes the step of contacting the solvent-treated material with an amount of the solvent-extracting composition sufficient to penetrate through the pores or the surface of the solvent-treated material.

In another embodiment, the inventive composition is substantially non-aqueous or the method involves contacting the solvent-treated material or its surface with a substantially non-aqueous solvent-extracting composition. In certain embodiments, water is not used in the method. In some embodiments, salts or salt solutions are not used in the method. For example, calcium chloride is not used in some embodiments. In a preferred embodiment, the solvent-extracting composition or solvent-extraction method is non-aqueous. In certain embodiments, the solvent-extracting composition or solvent-extraction method does not use cyclo-tetramethylene sulfones, aliphatic acid amides, N-methylpyrrolidones, N-alkylated pyrrolidones, piperidones, or polyethylene glycols. In some embodiments, the solvent-extracting composition or solvent-extraction/removal method does not use an emulsion for extracting/removing the solvent and any solvent associated liquids.

In certain embodiments, the use of heating or evaporation for removing solvent from a solvent-treated material can be avoided by using the method described in this disclosure. Thus, in some embodiments, the method of this disclosure does not involve evaporation of the trapped solvent before or during contacting with the solvent-extracting composition.

In certain embodiments, one or more surfactants may be added to the solvent-extraction method or the solvent-extracting composition. Yet in other embodiments, the solvent-extracting composition and process is surfactant-free or substantially surfactant-free. In certain embodiments, the solvent-extracting method or the solvent-extracting composition is micelle-free or substantially micelle-free.

In certain embodiments, the ratio of the solvent-extracting composition to solvent-treated material is in a range of about 1:6 and 15:1 by weight, or in a range of about 1:2 and 10:1 by weight. In another embodiment the ratio of the solvent-extracting composition to solvent-treated material is in a range of about 1:1 and 8:1 by weight. In another embodiment the ratio of the solvent-extracting composition to solvent-treated material is in a range of about 2:1 and 6:1 by weight. As used herein, ratios of solvent-extracting composition to solvent-treated material are expressed in terms of the ratio of the weight of solvent-extracting composition to the weight of the solvent-treated material. The weight of the solvent-treated material, means the weight of the material having solvent trapped, withheld, absorbed, adsorbed, or retained within its pores or overall weight of the solvent-soaked material and being subjected to the method of the invention.

In other embodiments, the amount of the solvent-extracting composition used is about 10 to about 2500 wt. % of the solvent-treated material. In certain embodiments, the amount of the solvent-extracting composition used is about 30 to about 200 wt. % of the solvent-treated material. In other embodiments, the amount of the solvent-extracting composition used is about 50 to about 150 wt. % of the solvent-treated material. In one embodiment, the amount of the solvent-extracting composition used is about 100 wt. % of the solvent-treated material.

In certain embodiments, the dissolution, displacement, removal, recovery, liquefaction, solubilization and/or extraction of solvents can be carried out at a temperature within the range of about 2° C. to about 400° C. In certain embodiments, the solvent-treated material is contacted with the solvent-extracting composition at a temperature of less than about 280° C., or less than about 160° C. In other embodiments, the dissolution, displacement, removal, recovery, liquefaction, solubilization and/or extraction temperatures can occur within the range of about 15° C. to about 150° C. In one embodiment, the inventive method includes boiling. In another embodiment, the inventive method includes boiling and refluxing the solvent-extracting composition after it is contacted with the solvent-treated material.

The contacting step for dissolution, displacement, removal, recovery, liquefaction, solubilization and/or extraction of the solvent-treated material can involve one or more steps including mixing, stirring, in-line static mixing, dipping, submerging, and/or any other means of contacting the solvent-treated material with the solvent-extracting composition. Boiling and refluxing of the solvent-extracting composition may be used, in part, to effect mixing and/or agitation. In one embodiment, the contacting step involves penetrating the solvent-extracting composition into the pores of the solvent-treated material.

The contacting step can occur over a period of 1 to 300 minutes. In one embodiment, the contacting step can occur over a period of 5 to 60 minutes, at a pressure between 1 and 10 atm. The contacting step may be repeated once or multiple times. For example, the contacting step may be repeated 1 to 10 times.

After contacting, the solvent-treated material is separated from the solvent-extracting composition. Separation can occur through any suitable means including, but not limited to, vacuum or pressure filtration, and/or gravity separation.

The solvent can be separated from the solvent-extracting composition via any suitable means including, but not limited to, flash evaporation, air drying, under vacuum, air blowing, or distillation. For example, a trapped turpentine liquid can be separated from a turpentine-extracting composition via any suitable means.

According to an aspect of the present invention, the solvent-treated material is contacted with a heterogeneous liquid including a solvent-extracting composition. In other embodiments, the solvent-treated material is contacted with a homogeneous, one-phase liquid. The homogeneous, one-phase liquid can comprise, consist essentially of, or consist of the solvent-extracting composition.

In certain embodiments, the ratio of alcohol, the organic compound with a hydroxyl functional group, and/or the organic or inorganic solvent in the solvent-extracting composition to water is greater than or equal to about 1:1 by volume.

According to another embodiment, a method is provided including the steps of liquefying, solubilizing and/or extracting hydrocarbon-containing organic matter from a hydrocarbon-containing material, such as coal, oil shale, tar (oil) sands, or a reservoir containing heavy crude oil, crude oil, natural gas (which frequently coexists with crude oils and other said fossil fuels), or a combination thereof. Hydrocarbon-containing organic matter includes, but is not limited to, heavy crude oil, crude oil, natural gas, petroleum gas, and the like. Hydrocarbon-containing organic matter can be solid, semi-solid, liquid, sludge, viscous liquid, liquid or gaseous form. Other materials that are suitable hydrocarbon-containing materials for treatment using the method of this invention include liquids and solids that include hydrocarbon-containing materials as well as a residual material. Exemplary hydrocarbon-containing materials can also include oil tank bottoms, oil pit or pond sludge and slurry mix, discarded foods, manure, sewage sludge or municipal garbage. Liquefying, solubilizing and/or extracting the hydrocarbon-containing organic matter includes the step of providing a hydrocarbon-extracting liquid, contacting the hydrocarbon-containing material with the hydrocarbon-extracting liquid so as to extract at least a portion of said hydrocarbon-containing organic matter from said hydrocarbon-containing material into said hydrocarbon-extracting liquid to create an extraction mixture that includes the hydrocarbon-containing organic matter that has been removed from the hydrocarbon-containing material and the hydrocarbon-extracting liquid, and separating the extracted organic matter in the hydrocarbon-extracting liquid from any residual material not extracted.

In one embodiment, the method includes a method of extracting hydrocarbon-containing organic matter from a hydrocarbon-containing material by providing a hydrocarbon-extracting liquid containing a turpentine liquid, contacting the hydrocarbon-containing material with the hydrocarbon-extracting liquid such that an extraction mixture is formed that contains at least a portion of the hydrocarbon-containing organic matter extracted into the hydrocarbon-extracting liquid, and separating the extraction mixture from any residual material containing non-soluble material from the hydrocarbon-containing material that is not soluble in the hydrocarbon-extracting liquid.

In one embodiment, the hydrocarbon-extracting liquid is substantially surfactant-free. In some embodiments, the hydrocarbon-extracting liquid is non-aqueous. The hydrocarbon-extracting liquid can be selected from the group consisting of natural turpentine, synthetic turpentine, mineral turpentine, pine oil, α-pinene, β-pinene, α-terpineol, β-terpineol, γ-terpineol, terpene resins, α-terpene, β-terpene, γ-terpene, geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof.

In one embodiment, the method includes separating the extraction mixture into a first portion and a second portion, the first portion of the extraction mixture comprising a hydrocarbon product comprising at least a portion of the hydrocarbon-containing organic matter, the second portion of the extraction mixture comprising at least a portion of the turpentine liquid.

In some embodiments, the method includes recycling at least a portion of the turpentine liquid to the hydrocarbon-extracting liquid for use in the contacting step.

In another aspect, a method for the recovery of hydrocarbon-containing organic matter from a hydrocarbon-containing material is provided. In one embodiment, the hydrocarbon-containing material can be a natural hydrocarbon-containing material from a naturally occurring geological formation. Some examples of natural hydrocarbon-containing materials are coal, crude oil, tar, tar (oil) sands, oil shale, oil sands, natural gas, petroleum gas, crude bitumen, natural kerogen, natural asphalt, and natural asphaltene. The method includes obtaining a hydrocarbon-containing material sample, such as by mining a formation rich in tar (oil) sands to provide a tar (oil) sands sample, wherein the hydrocarbon-containing material sample includes a recoverable hydrocarbon-containing organic matter and residual inorganic or insoluble material. The hydrocarbon-containing material sample is supplied to a contacting vessel, wherein the contacting vessel includes at least one inlet for supplying a hydrocarbon-extracting liquid that consists essentially of a turpentine liquid for recovery of hydrocarbons from the hydrocarbon-containing material.

The hydrocarbon-containing material sample is contacted with a hydrocarbon-extracting liquid and agitated to extract the hydrocarbon-containing organic matter from the hydrocarbon-containing material to produce a residual material and an extraction mixture. The extraction mixture includes the hydrocarbon-extracting liquid and recovered hydrocarbon-containing organic matter, and the residual material which includes at least a portion of the non-soluble material. The extraction mixture is separated from from the residual material, and is further separated into a hydrocarbon product stream and a hydrocarbon-extracting liquid stream, wherein the hydrocarbon-extracting liquid stream includes at least a portion of the hydrocarbon-containing organic matter extracted from the hydrocarbon-containing material. In certain embodiments, the method further includes the step of recycling the turpentine liquid stream to the contracting vessel. In other embodiments, the extraction mixture can be separated by distillation to produce the hydrocarbon product stream and the turpentine liquid recycle stream. The turpentine liquid includes at least one compound selected from natural turpentine, synthetic turpentine, mineral turpentine, pine oil, α-pinene, β-pinene, α-terpineol, β-terpineol, γ-terpineol, terpene resins, α-terpene, β-terpene, γ-terpene, or mixtures thereof. In other embodiments, the turpentine liquid includes at least one compound selected from geraniol, 3-carene, dipentene (p-mentha-1,8-diene), nopol, pinane, 2-pinane hydroperoxide, terpin hydrate, 2-pinanol, dihydromycenol, isoborneol, p-menthan-8-ol, α-terpinyl acetate, citronellol, p-menthan-8-yl acetate, 7-hydroxydihydrocitronellal, menthol, and mixtures thereof. In other embodiments, the turpentine liquid includes at least one compound selected from anethole, camphene; p-cymene, anisaldeyde, 3,7-dimethyl-1,6-octadiene, isobornyl acetate, ocimene, alloocimene, alloocimene alcohols, 2-methoxy-2,6-dimethyl-7,8-epoxyoctane, camphor, citral, 7-methoxydihydro-citronellal, 10-camphorsulphonic acid, cintronellal, menthone, and mixtures thereof. In one embodiment, the turpentine liquid includes at least about 30% by volume α-terpineol and at least about 25% by volume β-terpineol. In another embodiment, the turpentine liquid includes between about 30 and 70% by volume α-terpineol, between about 25 and 55% by volume β-terpineol, up to about 10% by volume α-terpene, and up to about 10% by volume β-terpene.

In another embodiment, hydrocarbon-containing organic matter, e.g., from oil sands is extracted into the hydrocarbon-extracting liquid in an amount that corresponds to an amount of from about 85 to 100% of the hydrocarbon-containing organic matter originally contained within the sample within about 3 seconds to 3 minutes of contacting at a contacting temperature in a range of from about 30 to 60° C. at a weight ratio of hydrocarbon-extracting liquid to the sample of from about 1:1 to 2:1.

As shown in Table 1, the specific formulation for extraction, liquefaction and/or solubilization of hydrocarbon-containing organic matter from tar (oil) sands varies based upon the particle size. In certain embodiments, the method for preparing a turpentine liquid for extracting hydrocarbon-containing organic matter from tar (oil) sands includes adjusting the amount of α-terpineol and β-terpineol in the formulation as a function of the size of the hydrocarbon rich solid particulate being extracted. In other embodiments, if the hydrocarbon-containing organic particulate matter includes low grade coal or an oil shale, the amount α-terpineol in the turpentine liquid is increased and the amount of β-terpineol in the turpentine liquid is decreased. In other embodiments, if the hydrocarbon-containing organic particulate matter includes tar (oil) sands, the amount α-terpineol in the turpentine liquid is decreased and the amount of β-terpineol in the turpentine liquid is increased. In other embodiments, if the hydrocarbon-containing organic particulate matter includes tar (oil) sands and the mean diameter of the particulate matter is less than about 4.76 mm, then the amount α-terpineol in the turpentine liquid is decreased and the amount of β-terpineol in the turpentine liquid is increased. In other embodiments, if the hydrocarbon-containing organic particulate matter includes tar (oil) sands and the mean diameter of the particulate matter is greater than about 25 mm (1 mesh), then the amount α-terpineol in the turpentine liquid is decreased and the amount of β-terpineol in the turpentine liquid is increased.

TABLE 1

Formulations for Extraction of Tar (oil) sands based upon Particle Size

| Particle Size (mm diameter) | α-terpineol | β-terpineol | α-/β-terpene | other |
| --- | --- | --- | --- | --- |
| <5 mm | 30-50% vol | 35-55% vol | 10% vol | 5% vol |
| 5 mm-25 mm | 40-60% vol | 30-50% vol | 10% vol | 5% vol |
| >25 mm | 50-70% vol | 25-45% vol | 10% vol | 5% vol |

Similar to what is shown above with respect to the extraction of tar (oil) sands, as shown in Tables 2 and 3, the formulation for extraction, liquefaction and/or solubilization of coal depends on particle size, quality of the coal being extracted, and general operating conditions. In one embodiment of the method for preparing a turpentine liquid for extracting hydrocarbon-containing organic matter, if the hydrocarbon-containing matter includes anthracite, bituminous coal, or other high grade coal and the mean diameter of the particulate matter is less than about 0.1 mm, then the amount of α-terpineol in the turpentine liquid is decreased and the amount of β-terpineol in the turpentine liquid is increased. In other embodiments, if the hydrocarbon rich particulate matter includes anthracite, bituminous coal, or other high grade coal and the mean diameter of the particulate matter is greater than about 1 mm, then the amount of α-terpineol in the turpentine liquid is decreased and the amount of β-terpineol in the turpentine liquid is increased. In another embodiment, if the hydrocarbon rich particulate matter includes low grade coal and the mean diameter of the particulate matter is less than about 0.07 mm, then the amount of α-terpineol in the turpentine liquid is decreased and the amount of β-terpineol in the turpentine liquid is increased. In another embodiment, if the hydrocarbon rich particulate matter includes low grade coal and the mean diameter of the particulate matter is greater than about 0.4 mm, then the amount of α-terpineol in the turpentine liquid is decreased and the amount of β-terpineol in the turpentine liquid is increased.

TABLE 2

Formulations for Extraction of High Grade Coal based upon Particle Size

| Particle Size (mm diameter) | α-terpineol | β-terpineol | α-/β-terpene | other |
|---|---|---|---|---|
| <0.15 mm | 45-65% vol | 35-45% vol | 10% vol | 0% vol |
| 0.8 mm-0.15 mm | 50-70% vol | 20-40% vol | 10% vol | 0% vol |
| >0.8 mm | 60-80% vol | 15-35% vol | 10% vol | 0% vol |

TABLE 3

Formulations for Extraction of Low Grade Coal based upon Particle Size

| Particle Size (mm diameter) | α-terpineol | β-terpineol | α-/β-terpene | other |
|---|---|---|---|---|
| <0.07 mm | 60-80% vol | 10-30% vol | 5% vol | 0% vol |
| 0.07 mm-0.4 mm | 70-90% vol | 5-25% vol | 5% vol | 0% vol |
| >0.4 mm | 75-95% vol | 0-20% vol | 5% vol | 0% vol |

Similar to what is shown above with respect to the extraction of tar (oil) sands and coal, as shown in Table 4, the formulation for extraction, liquefaction and/or solubilization of oil shale depends on particle size. In one embodiment of the method for preparing a composition for extracting hydrocarbon-containing organic matter, if the hydrocarbon rich particulate matter includes an oil shale and the mean diameter of the particulate matter is less than about 0.074 mm, then the amount of α-terpineol in the turpentine liquid is decreased and the amount of β-terpineol in the turpentine liquid is increased. In another embodiment, if the hydrocarbon rich particulate matter includes oil shale and the mean diameter of the particulate matter is greater than about 0.42 mm, then the amount of α-terpineol in the turpentine liquid is decreased and the amount of β-terpineol in the turpentine liquid is increased.

TABLE 4

Formulations for Extraction of Oil Shale based upon Particle Size

| Particle Size (mm diameter) | α-terpineol | β-terpineol | α-/β-terpene | other |
|---|---|---|---|---|
| <0.07 mm | 60-80% vol | 10-30% vol | 5% vol | 0% vol |
| 0.07 mm-0.4 mm | 70-90% vol | 5-25% vol | 5% vol | 0% vol |
| >0.4 mm | 75-95% vol | 0-20% vol | 5% vol | 0% vol |

The formulation for the extraction of crude oil similarly depends on the type of crude oil being extracted, liquefied, and/or solubilized. As shown in Table 5, the formulation for the extraction, liquefaction and/or solubilization of crude oil is a function of both pore size and the quality of the density of the crude oil being extracted. The method includes providing a turpentine liquid formulation that includes at least about 50% by volume α-terpineol and at least about 20% by volume β-terpineol; adjusting the amount of α-terpineol and β-terpineol in the turpentine liquid formulation based upon the density of the liquid hydrocarbon being extracted. In one embodiment, if the API gravity of the liquid hydrocarbon being extracted is greater than about 22°, then the amount of α-terpineol in the turpentine liquid is decreased and the amount of β-terpineol in the turpentine liquid is increased. In another embodiment, if the API gravity of the liquid hydrocarbon being extracted is less than about 22, then the amount of α-terpineol in the turpentine liquid is increased and the amount of β-terpineol in the turpentine liquid is decreased. As used herein, light oils have an API of at least about 31°, medium crude oils have an API of between about 22° and about 31°, heavy oil has an API of between about 10° and about 22°, and extra heavy oil has an API of less than about 10°.

TABLE 5

Formulations for Extraction of Crude Oil based upon API Density

| Crude Type | α-terpineol | β-terpineol | α-/β-terpene | other |
|---|---|---|---|---|
| Light/medium crude (API greater than 22°) | 40-70% vol | 30-40% vol | 10% vol | 10% vol |
| Heavy/Extra Heavy (API less than 22°) | 50-70% vol | 20-35% vol | 10% vol | 5% vol |

In one embodiment, this disclosure provides a method of extracting hydrocarbon-containing organic matter from oil shale or tar (oil) sands into turpentine liquids and/or other associated liquids and subsequently dissolving, extracting, recovering, and/or removing turpentine liquids and/or other associated liquids from a turpentine liquid-treated material, comprising the steps of extracting the hydrocarbon-containing organic matter by first using a hydrocarbon-extracting liquid comprising a non-aqueous turpentine liquid; contacting the oil shale or tar (oil) sands with a hydrocarbon-extracting liquid such that an extraction mixture is formed, the extraction mixture comprising at least a portion of hydrocarbon-containing organic matter from the oil shale or tar (oil) sands extracted into the turpentine liquid; separating the extraction mixture from a residual turpentine liquid-treated material containing non-soluble material from the oil shale or tar (oil) sands that is not soluble in the hydrocarbon-extracting liquid; providing a solvent-extracting composition; contacting the residual turpentine liquid-treated material containing non-soluble material from the oil shale or tar (oil) sands that is not soluble in the hydrocarbon-extracting liquid with the solvent-extracting composition such that the solvent-extracting composition penetrates into pores of the residual turpentine liquid-treated material, forming a recovery mixture, wherein the recovery mixture has at least a portion of the turpentine liquid and any associated liquids extracted into the solvent-extracting composition; and separating the recovery mixture from any material containing non-extracted material from the turpentine liquid-treated material that is not extracted into the solvent-extracting composition.

Still other aspects and advantages of the present invention will become easily apparent by those skilled in the art from this description, wherein certain embodiments of the invention are shown and described simply by way of illustration of the best mode contemplated of carrying out the invention. As will be realized, the invention is capable of other and different embodiments, and its several details are capable of modifications in various obvious respects, without departing from the invention. Accordingly, the description is to be regarded as illustrative in nature and not as restrictive.

EXAMPLES

Example 1

Extraction of Turpentine Liquid from Rubber

A crumb rubber sample having turpentine liquid trapped within its pores was subjected to solvent extraction according to the present invention. The crumb rubber sample was initially tested and found to have about 200 wt. % turpentine. The crumb rubber sample was mixed with isopropyl alcohol (IPA) at a 1:1 mass ratio under ambient pressure and at about 15° C. for 5 minutes. The mixing procedure was repeated twice. After extraction, the amount of turpentine liquid remaining in the pores of the crumb rubber sample was about 0.001 wt. % of the crumb rubber.

Example 2

Extraction of Turpentine Liquid from Coal

A coal sample having turpentine liquid trapped within its pores was subjected to solvent extraction according to the present invention. The coal sample was initially tested and found to have about 40 wt. % turpentine. The coal sample was mixed with hexane at a 1:1 mass ratio under ambient pressure and at about 70° C. for about 30 minutes. The mixing procedure was performed twice. After extraction, the amount of turpentine liquid remaining in the pores of the coal sample was about 1 wt. % of the coal.

Example 3

Extraction of Solvents From Rubber

Crumb rubber samples having various solvents trapped within pores were subjected to solvent extraction according to the present invention as summarized in the below table.

| Solvent | Temperature | Contact Time (min) | Pressure | Solvent-extracting Composition | Percentage of Trapped Solvent Extracted |
|---|---|---|---|---|---|
| Para-cymene | ~20° C. | 5-15 | Ambient | isopropanol | 95-99% |
| Pinene | ~20° C. | 5-15 | Ambient | isopropanol | 95-99% |
| Dimethyl sulfoxide (DMSO) | ~20° C. | 5-15 | Ambient | isopropanol | 95-99% |
| Mixture of DMSO with a blend of turpentine liquids (30:70) | ~20° C. | 5-15 | Ambient | isopropanol | 95-99% |
| Mixture of toluene with a blend of turpentine liquids (50:50) | ~20° C. | 5-15 | Ambient | isopropanol | 95-99% |
| Blend of turpentine liquids | ~20-40° C. | 5-15 | Ambient | methanol | 95-99% |
| Blend of turpentine liquids | ~20-40° C. | 5-15 | Ambient | ethanol | 95-99% |
| Blend of turpentine liquids | ~20-40° C. | 5-15 | Ambient | propanol | 95-99% |
| Blend of turpentine liquids | ~20-40° C. | 5-15 | Ambient | isopropanol | 95-99% |
| Blend of turpentine liquids | ~20-40° C. | 5-15 | Ambient | butanol | 95-99% |

Example 4

Extraction of Bitumen (Organic Matter) from Tar (Oil) Sands

Tar (oil) sands from Alberta, Canada were solubilized and extracted with commercial grade synthetic turpentine. The tar (oil) sands sample was obtained from Alberta Research Council, which provided the following proximate analyses for it; 84.4 wt. % of dry solids, 11.6 wt. % of dry bitumen, and 4.0 wt. % of as-received moisture. About 30 grams of synthetic turpentine were gently added to about 15 grams of the sample in a capped, but not tightly sealed, extraction vessel, utilizing a reagent-to-sample ratio of about 2 to 1 by weight. This extraction vessel, containing the resultant mixture of synthetic turpentine and tar (oil) sands, was maintained at a constant temperature of about 96° C. and continually agitated. Without boiling of the synthetic turpentine, the pressure in the extraction vessel remained at the ambient pressure of slightly less than about $1.01 \times 10^5$ Pascals (1 atm). After about 20 minutes, the mixture in the extraction vessel was filtered and the solids (tar (oil) sands) retained on the filter were washed with ethanol and dried to a constant weight. On the basis of weight loss, the conversion, i.e., the degree of extraction, of bitumen from the tar (oil) sands sample was determined to be about 100 wt. %.

Example 5

Extraction of Bitumen (Organic Matter) from Tar (Oil) Sands

In this example, about 60 grams of the tar-sands sample from the same source with the same proximate analyses as those of the preceding example were extracted by about 60 grams of a-terpineol, instead of commercial-grade synthetic turpentine, which includes α-terpineol. The resultant reagent-to-sample ratio was 1 to 1 instead of 2 to 1 as in the preceding example. The experiment lasted about 30 minutes at the temperature of about 96° C. under the ambient pressure of slightly less than about $1.01 \times 10^5$ Pascals (1 atm). The conversion, i.e., the extent of extraction, of bitumen (organic matter) in the tar-sands sample was determined to be about 100 wt. %.

Example 6

Extraction of Bitumen (Organic Matter) from Tar (Oil) Sands

In this example, about 60 grams of the tar-sands sample from the same source with the same proximate analyses as those of the preceding two examples were extracted by about 60 grams of synthetic turpentine, which is of the commercial grade. The resultant reagent-to-sample ratio, therefore, was about 1 to 1. The experiment was carried out for about 30 minutes at the temperature of about 96° C. under the ambient pressure of slightly less than about $1.01 \times 10^5$ Pascals (1 atm). The conversion, i.e., the degree of extraction, of bitumen (organic matter) in the tar-sands sample was determined to be about 70 wt. %.

Example 7

The experiment in this example was carried out under the ambient pressure of slightly less than about $1.01 \times 10^5$ Pascals (1 atm) with the tar-sands sample from the same source with the same proximate analyses as those in the preceding examples with tar (oil) sands. About 60 grams of commercial-grade synthetic turpentine was added to about 60 grams of the tar-sands sample, thus giving rise to the reagent-to-sample ratio of about 1 to 1. The temperature of the sample and commercial-grade synthetic turpentine was maintained at about 65° C. for about 30 minutes followed by cooling to about 15° C. within about 5 minutes. Subsequently, the tar-sands sample was filtered, washed, dried and weighed. On the basis of weight loss, the conversion, i.e., the degree of extraction, of bitumen (organic matter) in the tar-sands sample was determined to be about 70 wt. %.

Example 8

The experiment in this example repeated that of the preceding example with α-terpineol instead of commercial grade synthetic turpentine. The conversion, i.e., the degree of extraction, of bitumen (organic matter) increased to about 90 wt. % from about 70 wt. % of the preceding examples.

Example 9

In this example, a tar-sands sample, weighing about 30 grams, from the same source with the same proximate analyses as those in Examples 11 through 17, was extracted with a liquid that included about 20 grams (80 wt. %) of α-terpineol and about 5 grams (20 wt. %) of toluene at the temperature of about 96° C. under the ambient pressure of slightly less than about $1.01 \times 10^5$ Pascals (1 atm). The duration of the experiment (reaction or extraction time) was about 30 minutes. The weigh loss of the sample was about 10.2 grams. From this weigh loss, the conversion, i.e., the degree of extraction, of bitumen (organic matter) was estimated to be about 33 wt. %.

Example 10

Three tar-sands samples, all from the same source with the same proximate analyses as those used in all preceding examples with tar (oil) sands were extracted by reagents comprising various amounts of α-terpineol and ethanol at the temperature of about 15° C. under the ambient pressure of slightly less than about $1.01 \times 10^5$ Pascals (1 atm). The duration of each experiment (reaction or extraction time) was about 15 minutes for each tar-sands sample. The first sample was extracted with a mixture comprising about 0 gram (0 wt. %) of α-terpineol and about 15 grams (100 wt. %) of ethanol, i.e., with pure ethanol. The second sample was extracted with a mixture comprising about 7.5 grams (50 wt. %) of α-terpineol and about 7.5 grams (50 wt. %) of ethanol. The third sample was extracted with a mixture comprising about 12 grams (80 wt. %) of α-terpineol and about 3 grams (20 wt. %) of ethanol. The weight losses and the estimated conversions, i.e., the degrees of extraction, of bitumen (organic matter) in the three samples were about 0.2 gram (1.0 wt. %), 0.6 gram (3.0 wt. %) and 0.9 gram (4.5 wt. %), for the first, second and third sample, respectively.

Example 11

Irregular-shaped pellets of commercial-grade asphalt whose average size was about 15 mm were solubilized and extracted with α-terpineol and at the ambient temperature of about 22° C. under the ambient pressure of slightly less than about $1.01 \times 10^5$ Pascals (1 atm). The first sample weighing about 20 grams was solubilized and extracted with about 40 grams of α-terpineol, and the second sample also weighing about 20 grams was solubilized and extracted with about 20 grams of α-terpineol. The hydrocarbons in both samples were completely extracted after 30 minutes. These experiments were carried out to simulate the solubilization and extraction of heavy crude oil, which tends to be rich in asphaltenes like asphalt.

Example 12

In this example, bitumen (organic matter) in tar-sands from the same source with the same proximate analyses as those used in all previous examples with tar (oil) sands was solubilized and extracted with two varieties of vegetable oils, soybean oil and corn oil. The vegetable oils are completely miscible with turpentine liquid. In the first experiment, a tar-sands sample weighing about 15 grams was blended and agitated continually with about 30 grams of soybean oil for about 20 minutes at the temperature of about 96° C. under the ambient pressure of slightly less than about $1.01 \times 10^5$ Pascals (1 atm). The weight loss was about 0.5 gram from which the conversion, i.e., the degree of extraction, of bitumen in the sample was estimated to be about 3.3 wt. %. In the second experiment, a tar-sands sample weighing about 30 grams was blended and agitated continually with about 60 grams of corn oil for about 30 minutes at the temperature of about 175° C. under the ambient pressure of slightly less than about $1.01 \times 10^5$ Pascals (1 atm). The weight loss was about 4.8 grams from which the conversion, i.e., the degree of extraction, of bitumen in the sample was estimated to be about 12 wt. %.

Example 13

Two tests were performed on Berea sandstone plug core samples to determine the effect of reagent injection on oil recovery from core. The first test was designed to determine the increment oil recovery due to α-terpineol injection after a field had already undergone waterflooding to the limit. The selected core contained 9.01 mL of laboratory oil simulating crude oil. The waterflooding with aqueous solution containing 3.0% of potassium chloride produced 4.6 mL of oil. Five (5) pore volumes of α-terpineol injection produced additional 3.61 mL of oil, thereby leaving the core with less than 8.0% of oil remaining in the original volume. The second test was designed to represent the increased recovery that could be expected from a virgin reservoir with α-terpineol injection. The selected core contained 8.85 mL of laboratory oil simulating crude oil. Oil production began after approximately 0.5 pore volumes of α-terpineol injection, and continued until 3.5 pore volumes of α-terpineol had been injected; however, the majority of the oil was recovered after only 2.5 pore volumes of α-terpineol injection. A total of 7.94 mL of laboratory oil was recovered, thereby leaving the core with less than 7.5% of oil remaining in the original volume.

In one experiment, various ratios of a turpentine liquid to tar (oil) sands sample were tested. The turpentine liquid for each of the experiments provided below had the same formulation, wherein the composition included about 60% by volume α-terpineol, about 20% by volume β-terpineol, and about 20% by volume γ-terpineol. The tar (oil) sands were a different mix of ores from Alberta, Canada, having a bitumen content of approximately 12% by weight and a water content of between about 4-5% by weight. The experiments were all performed at various temperatures as listed in Table 6.

As shown in Table 6 below, recovery of hydrocarbons from tar (oil) sands across all ratios provided below (i.e., ratios of turpentine liquid to tar (oil) sands ranging from about 1:2 to about 2:1) resulted in good recovery of hydrocarbons and little discernible difference. With respect to the temperature at which the extraction is carried out, it is believed that the optimum temperature for the extraction, solubilization and/or liquefaction of hydrocarbons from tar (oil) sands is about 65° C. As shown in Table 6, at about 130° C., the amount of hydrocarbons recovered from the tar (oil) sands is reduced. It is noted however, that for certain solids from which it is particularly difficult to recover hydrocarbons, increasing the temperature of the extraction solvent can increase the amount of hydrocarbons that are recovered. Finally, it is shown that exposure time had very little effect on the amount of materials that were extracted. This is likely because the shortest extraction time was about 20 minutes, which is believed to be more than adequate for the extraction of the hydrocarbons from tar (oil) sands.

TABLE 6

| Tar (oil) sands Weight, g | Extractable HC weight, g | Weight of extraction solvent | Ratio of tar (oil) sands to solvent | Amount of HC extracted, g | Percent HC extracted | Temp, ° C. | Exposure Time, minutes |
|---|---|---|---|---|---|---|---|
| 15 | 2.0 | 30.0 | 1:2 | 3.2 | 161 | 96 | 20 |
| 60 | 7.8 | 120.0 | 1:2 | 5.4 | 69 | 96 | 30 |
| 60 | 7.8 | 31.6 | 2:1 | 9.6 | 123 | 96 | 30 |
| 60 | 7.8 | 60.0 | 1:1 | 7.6 | 97 | 65 | 30 |
| 60 | 7.8 | 60.0 | 1:1 | 4.0 | 51 | 130 | 30 |
| 60 | 7.8 | 60.0 | 1:1 | 6.3 | 80 | 65 | 30 |

Additional experiments were conducted using alternative solvents, namely ethanol and corn oil, which was compared with the composition that included about 60% by volume α-terpineol, about 20% by volume β-terpineol, and about 20% by volume γ-terpineol. As noted in Table 7 provided below, the performance of ethanol and corn oil were unexpectedly substantially lower than the composition that included about 60% by volume α-terpineol, about 20% by volume β-terpineol, and about 20% by volume γ-terpineol. For example, whereas the terpineol composition achieved complete or nearly complete extraction of extractable hydrocarbons, ethanol yielded only about 10% of the recoverable hydrocarbons and heated corn oil yielded only about 33% of the recoverable hydrocarbons.

TABLE 7

| Chemical | Tar (oil) sands Weight, g | Extractable HC weight, g | Weight of extraction solvent | Ratio of tar (oil) sands to solvent | Amount of HC extracted, g | Percent HC extracted | Temp, ° C. | Exposure Time, minutes |
|---|---|---|---|---|---|---|---|---|
| Ethanol | 15 | 2.0 | 15.0 | 1:1 | 0.2 | 10 | 15 | 15 |
| Corn oil | 30 | 3.9 | 60.0 | 2:1 | 1.3 | 33 | 175 | 30 |
| 60/20/20 terpineol | 60 | 7.8 | 60.0 | 1:1 | 7.6 | 97 | 65 | 30 |
| 60/20/20 terpineol | 60 | 7.8 | 31.6 | 2:1 | 9.6 | 123 | 96 | 30 |

As shown in Table 8 below, the performance of various turpentine liquid formulations, including turpentine liquid formulations that include only α-terpineol and α-terpineol in combination with various known organic solvents, are provided. The first three compositions presented in the table include α-terpineol, β-terpineol, and γ-terpineol. For example, the first same includes about 60% by volume α-terpineol, about 30% by volume β-terpineol, and about 10% by volume γ-terpineol. The results unexpectedly show erable hydrocarbons is achieved with a composition that includes about a 1:1 ratio of α-terpineol to ethanol. This is unexpected as pure ethanol only removed about 10% of the total recoverable hydrocarbons. Additionally, mixed systems that include either a 1:1 or a 3:1 ratio of α-terpineol to toluene still resulted in the recovery of about 77% and 92% of the total recoverable hydrocarbons. This was an unexpected result.

TABLE 8

| Chemical comp. | Tar (oil) sands wt., g | Extractable HC wt., g | Wt. of solvent | Ratio of tar (oil) sands to solvent | Amount of HC extracted, g | Percent HC extracted | Temp, ° C. | Exposure Time, minutes |
|---|---|---|---|---|---|---|---|---|
| 60/30/10 α-terpineol/β-terpineol/and γ-terpineol | 60 | 2.0 | 60.0 | 1:1 | 7.1 | 91 | 96 | 30 |
| 40/30/20 α-terpineol/β-terpineol/and γ-terpineol | 60 | 7.8 | 60.0 | 1:1 | 4.7 | 60 | 96 | 30 |
| 70/20/10 α-terpineol/β-terpineol/and γ-terpineol | 60 | 7.8 | 60.0 | 1:1 | 7.9 | 101 | 96 | 30 |
| 100% α-terpineol | 60 | 7.8 | 60.0 | 1:1 | 10.0 | 128 | 96 | 30 |
| 100% α-terpineol | 60 | 7.8 | 120.0 | 1:2 | 8.7 | 111 | 96 | 30 |
| 100% α-terpineol | 60 | 7.8 | 31.0 | 2:1 | 9.6 | 123 | 96 | 30 |
| 50% α-terpineol/50% ethanol | 15 | 2.0 | 15.0 | 1:1 | 8.1 | 103 | 65 | 30 |
| 80% α-terpineol/20% ethanol | 15 | 2.0 | 15.0 | 1:1 | 1.2 | 62 | 15 | 15 |
| 75% α-terpineol/25% toluene | 30 | 3.9 | 25.0 | 1:0.8 | 1.8 | 92 | 15 | 15 |
| 50% α-terpineol/50% toluene | 30 | 3.9 | 26.0 | 1:0.9 | 3.0 | 77 | 96 | 30 |
| 50% α-terpineol/50% xylenes | 30 | 3.9 | 26.0 | 1:0.9 | 2.4 | 61 | 96 | 30 | that as the concentration of the α-terpineol increases, performance of the turpentine liquid increases to the point that when the turpentine liquid includes approximately 70% α-terpineol, full extraction of the hydrocarbon material from the tar (oil) sands sample is achieved.

The second set of data is presented for extraction of hydrocarbon bearing tar (oil) sands with pure α-terpineol. As shown, extraction of greater than 100% is achieved, likely due to inconsistencies in the hydrocarbon content of the samples. However, the results generally demonstrate the unexpected result that α-terpineol is capable of extracting substantially all of the recoverable hydrocarbon from a tar (oil) sands sample.

The data provided in Table 8 illustrates the effectiveness of mixed systems of α-terpineol and known organic solvents. As shown, substantially complete recovery of recov- Example 14

Approximately 30 g tar (oil) sands samples were sprayed with each of the following liquids: d-limonene, a blend of turpentine liquids, and water as a control. Temperature was maintained at about 18° C. The percent of bitumen recovered was measured after a contact time of about 5, 10, 15, 20, 25, and 30 seconds. The blend of turpentine liquids was a more effective extractor than d-limonene, whereas water was ineffective.

Example 15

Approximately 15 g tar (oil) sands samples were sprayed with d-limonene or a blend of turpentine liquids and left in contact with the liquid for 97 seconds. The ratio of liquid to tar (oil) sands ranged from approximately 1:1 to approximately 6:1. From 54% recovery at 1:1 to 84% recovery at 6:1 ratios, the blend of turpentine liquids extracted more bitumen than the limonene across the range of mixing ratios.

Example 16

The effectiveness of a number of turpentine liquid species and combinations for extracting hydrocarbon was measured relative to the ability of each liquid to
recover bitumen from a tar (oil) sands sample. In each test, an approximately 15 g tar (oil) sands sample was treated at about 18° C. with one of the following turpentine liquids: α-terpineol, β-terpineol, β-pinene, α-pinene p-cymene, d-limonene, and a blend of turpentine liquids. The percent of bitumen recovered was measured after contact times of about 5 and about 15 minutes. The data show that all of the liquids extracted a substantial amount of the bitumen from the tar (oil) sands. The blend of turpentine liquids was the most effective extractor across the range of liquid to material ratios, recovering nearly all of the bitumen content within about 5 minutes of contact.

As measured herein, the recovery, i.e., yield, in certain samples exceeds 100% because certain hydrocarbon-containing materials, e.g., tar (oil) sands, include heterogeneous and impure mixtures of exceedingly viscous liquid and relatively coarse solid particles, irregular in shape and varying in size. Thus, recovery measurements based on the average value of hydrocarbon matter in the hydrocarbon-containing materials at times exceed 100% due to these naturally variable factors. Further, some experimental errors are inherent to any experiment.

The results for the extraction of turpentine liquid from turpentine liquid-treated material described in the specification, and especially in the Examples above, were unexpected. Surprising advantages were realized in economic efficiencies achieved through practicing the claimed invention.

As used herein, the terms about and approximately should be interpreted to include any values which are within 5% of the recited value. Furthermore, recitation of the term about and approximately with respect to a range of values should be interpreted to include both the upper and lower end of the recited range. As used herein, the terms first, second, third and the like should be interpreted to uniquely identify elements and do not imply or restrict to any particular sequencing of elements or steps.

While the invention has been shown or described in only some of its embodiments, it should be apparent to those skilled in the art that it is not so limited, but is susceptible to various changes without departing from the scope of the invention.

The invention claimed is:

1. A method for removing a turpentine liquid and solvent-associated liquids trapped within pores of a material, the material having entrapped a hydrocarbon-containing material having API gravity of more than 10° has been treated with turpentine liquid, comprising the steps of:
   a) providing a solvent-extracting composition,
   b) contacting said material having entrapped a hydrocarbon-containing material having API gravity of more than 10° that has been treated with turpentine liquid with said solvent-extracting composition such that said solvent-extracting composition penetrates into pores of the material,
   c) forming a recovery mixture, wherein the recovery mixture comprises at least a portion of the turpentine liquid and solvent-associated liquids extracted into the solvent-extracting composition; and
   d) separating the recovery mixture from any residual material containing non-extracted material from the material having API gravity of more than 10° that has been treated with said turpentine liquid that is not extracted into the solvent-extracting composition.

2. The method of claim 1, further comprising the step of:
   separating the recovery mixture into a first portion and a second portion, the first portion comprising a turpentine liquid product stream that includes at least a portion of the turpentine liquid and any solvent-associated liquids extracted from the pores of the material, the second portion comprising at least a portion of the solvent-extracting composition.

3. The method of claim 1, wherein said turpentine liquid further comprises a second liquid selected from an alkane, an aromatic, an aliphatic amine, an aromatic amine, carbon bisulfide, a solvent manufactured in petroleum refining, a solvent manufactured in dry distilling coal, a solvent manufactured in fractionating liquefied coal, or a mixture thereof.

4. The method of claim 3, wherein said solvent-extracting composition comprises an alcohol and the ratio of alcohol in the solvent-extracting composition to the second liquid is greater than or equal to about 1:1 by volume.

5. The method of claim 3, wherein said solvent-extracting composition comprises an organic compound with a hydroxyl functional group, an organic or inorganic solvent, or a combination thereof and the ratio of the organic compound with a hydroxyl functional group, and/or the organic or inorganic solvent in the solvent-extracting composition to the second liquid is greater than or equal to about 1:1 by volume.

6. The method of claim 1, wherein said turpentine liquid is selected from natural turpentine, synthetic turpentine, mineral turpentine, pine oil, alpha-pinene, beta-pinene, alpha-terpineol, beta-terpineol, gamma-terpineol, 3-carene, anethole, dipentene (p-mentha-1,8-diene), terpene resins, alpha-terpene, beta-terpene, gamma terpene, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2, 6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, or mixtures thereof.

7. The method of claim 6, wherein said turpentine liquid comprises alpha-terpineol, alpha-pinene, beta-pinene, p-cymene, or a combination thereof.

8. The method of claim 1, wherein said solvent-extracting composition comprises an alcohol.

9. The method of claim 1, wherein said solvent-extracting composition comprises one or more acyclic or cyclic alcohols.

10. The method of claim 1, wherein said solvent-extracting composition comprises methanol, ethanol, propanol, isopropanol, butanol, isobutanol, pentanol, 1-Pentanol, 3-Methyl-1-butanol, 2-Methyl-1-butanol, 2,2-Dimethyl-1-propanol, 3-Pentanol, 2-Pentanol, 3-Methyl-2-butanol, 2-Methyl-2-butanol, hexanol, 1-Hexanol, 2-Hexanol, 3-Hexanol, 2-Methyl-1-pentanol, 3-Methyl-1-pentanol, 4-Methyl-1-pentanol, 2-Methyl-2-pentanol, 3-Methyl-2-pentanol, 4-Methyl-2-pentanol, 2-Methyl-3-pentanol, Tertiary 3-Methyl-3-pentanol, Primary 2,2-Dimethyl-1-butanol, 2,3-Dimethyl-1-butanol, 3,3-Dimethyl-1-butanol, 2,3-Dimethyl-2-butanol, 3,3-Dimethyl-2-butanol, 2-Ethyl-1-butanol, benzene, toluene, methyl ethyl ketone (MEK), furfural, tetrahydrofuran (THF), acetone, hydrofluoric acid, hexane, xylene, or a mixture thereof.

11. The method of claim 1, wherein said solvent-extracting composition comprises methanol, ethanol, propanol, isopropanol, butanol, isobutanol, pentanol, hexanol, or a mixture thereof.

12. The method of claim 1, wherein said material is contacted with said solvent-extracting composition in a ratio range of about 1:6 to 6:1 by weight.

13. The method of claim 12, wherein the material is contacted with said solvent-extracting composition in a ratio of about 1:4 to 2:1 by weight.

14. The method of claim 12, wherein the material is contacted with said solvent-extracting composition in a ratio of about 1:3 to 1:1 by weight.

15. The method of claim 1, wherein the amount of the solvent-extracting composition in said recovery mixture is about 10 to about 2500 wt. % of the material.

16. The method of claim 15, wherein the amount of the solvent-extracting composition in said recovery mixture is about 30 to about 200 wt. % of the material.

17. The method of claim 16, wherein the amount of the solvent-extracting composition in said recovery mixture is about 50 to about 150 wt.% of the material.

18. The method of claim 17, wherein the amount of the solvent-extracting composition in said recovery mixture is about 100 wt. % of the material.

19. The method of claim 1, wherein said contacting is carried out at a temperature within the range of about 2° C. to about 400° C.

20. The method of claim 19, wherein said contacting is carried out at a temperature within the range of about 15° C. to about 150° C.

21. The method of claim 1, wherein said material is contacted with said solvent-extracting composition for 1 to 300 minutes.

22. The method of claim 21, wherein said material is contacted with said solvent-extracting composition for 5 to 60 minutes.

23. The method of claim 1, wherein said contacting step (b) is repeated 1 to 10 times before performing step (c).

24. The method of claim 1, wherein said solvent-extracting composition comprises at least 10% alcohol.

25. The method of claim 1, wherein said solvent-extracting composition comprises at least 50% alcohol.

26. The method of claim 1, wherein said solvent-extracting composition comprises at least 90% alcohol.

27. The method of claim 1, wherein said contacting extracts at least 50% of turpentine liquid and any solvent-associated liquids contained within said material before said contacting.

28. The method of claim 1, wherein said contacting extracts at least 80% of turpentine liquid and any solvent-associated liquids contained within said material before said contacting.

29. The method of claim 1, wherein said contacting further comprises boiling and refluxing said solvent-extracting composition.

30. The method of claim 1, wherein said method comprises contacting said material with a substantially non-aqueous solvent-extracting composition.

31. The method of claim 1, wherein said method does not involve the use of water or an emulsion.

32. The method of claim 1, wherein said method does not involve the use of salt or salt solution.

33. The method of claim 1, wherein said solvent-extracting composition comprises a surfactant.

34. The method of claim 1, wherein said solvent-extracting composition is surfactant-free or substantially surfactant-free.

35. The method of claim 1, wherein said solvent-extracting composition is micelle-free or substantially micelle-free.

36. The method of claim 1, wherein said solvent-extracting composition comprises an organic compound with a hydroxyl functional group, an organic or inorganic solvent, or a combination thereof.

37. The method of claim 1, wherein said turpentine liquid further comprises a second liquid selected from benzene, naphthalene, toluene, pentane, heptane, hexane, xylene, anthracene, tetraline, trimethylamine, aniline, carbon bisulfide, a decant oil, a light cycle oil, naphtha, or a mixture thereof.

* * * * *